(12) United States Patent
Deguchi et al.

(10) Patent No.: US 8,067,119 B2
(45) Date of Patent: Nov. 29, 2011

(54) NON-AQUEOUS ELECTROLYTE SECONDARY BATTERY

(75) Inventors: Masaki Deguchi, Hyogo (JP); Tooru Matsui, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 86 days.

(21) Appl. No.: 12/096,262

(22) PCT Filed: May 18, 2007

(86) PCT No.: PCT/JP2007/060201
§ 371 (c)(1),
(2), (4) Date: Jun. 5, 2008

(87) PCT Pub. No.: WO2007/135974
PCT Pub. Date: Nov. 29, 2007

(65) Prior Publication Data
US 2009/0246641 A1    Oct. 1, 2009

(30) Foreign Application Priority Data
May 19, 2006  (JP) .................................. 2006-140011

(51) Int. Cl.
*H01M 6/04* (2006.01)
*H01M 6/16* (2006.01)

(52) U.S. Cl. ........................................ 429/326; 429/188

(58) Field of Classification Search .................. 429/326
See application file for complete search history.

(56) References Cited

U.S. PATENT DOCUMENTS

| | | | | |
|---|---|---|---|---|
| 5,427,872 A * | 6/1995 | Shen et al. | ..................... | 429/142 |
| 6,506,524 B1 * | 1/2003 | McMillan et al. | ............. | 429/324 |
| 6,723,473 B1 * | 4/2004 | Oura et al. | ..................... | 429/329 |
| 2002/0197537 A1 * | 12/2002 | Kim et al. | ..................... | 429/340 |
| 2003/0138699 A1 | 7/2003 | Kweon et al. | | |
| 2005/0095507 A1 * | 5/2005 | Kim et al. | ..................... | 429/331 |

(Continued)

FOREIGN PATENT DOCUMENTS

CN  1612383 A  5/2005

(Continued)

OTHER PUBLICATIONS

Korean Office Action issued in Korean Patent Application No. 10-2008-7016225, mailed on Jun. 25, 2010.

(Continued)

*Primary Examiner* — Jennifer K. Michener
*Assistant Examiner* — Eli Mekhlin
(74) *Attorney, Agent, or Firm* — McDermott Will & Emery LLP

(57) ABSTRACT

A non-aqueous electrolyte secondary battery of the present invention includes a positive electrode including an active material absorbing and desorbing lithium ions, a negative electrode including an active material absorbing and desorbing lithium ions, a separator interposed between the positive electrode and the negative electrode, and a non-aqueous electrolyte. The separator includes a material containing a substituent group with electron-withdrawing property. The non-aqueous electrolyte includes a non-aqueous solvent and a solute dissolved therein, and the non-aqueous solvent includes at least one selected from the group consisting of a fluorine-containing aromatic solvent, a fluorine-containing cyclic carbonic acid ester, and a fluorine-containing cyclic carboxylic acid ester.

The combination of the foregoing separator and the foregoing non-aqueous electrolyte makes it possible to suppress the deterioration in the rate performance of the battery even when the battery is stored under high voltage and high temperature.

6 Claims, 2 Drawing Sheets

U.S. PATENT DOCUMENTS

| | | |
|---|---|---|
| 2005/0170250 A1* | 8/2005 | Ohzuku et al. ............ 429/231.1 |
| 2005/0170254 A1* | 8/2005 | West et al. .................... 429/313 |
| 2006/0083988 A1* | 4/2006 | Deguchi et al. ............... 429/223 |
| 2006/0099512 A1 | 5/2006 | Nakai et al. |
| 2006/0127753 A1 | 6/2006 | Nakashima et al. |
| 2006/0166091 A1 | 7/2006 | Deguchi et al. |
| 2007/0111093 A1* | 5/2007 | Kashiwagi et al. ........... 429/199 |
| 2007/0148554 A1 | 6/2007 | Abe |

FOREIGN PATENT DOCUMENTS

| | | |
|---|---|---|
| JP | 5-205721 | 8/1993 |
| JP | 5-258741 | 10/1993 |
| JP | 2004-63432 | 2/2004 |
| JP | 2005-340026 | 12/2005 |
| JP | 2006-294518 | 10/2006 |
| KR | 10-0441524 | 7/2004 |
| WO | WO 2005/074067 A1 | 8/2005 |
| WO | WO 2005/112150 A1 | 11/2005 |

OTHER PUBLICATIONS

Translation of Chinese Office Action issued in Chinese Patent Application No. CN 2007800023514 dated Oct. 9, 2009.

* cited by examiner

NON-AQUEOUS ELECTROLYTE SECONDARY BATTERY

RELATED APPLICATIONS

This application is the U.S. National Phase under 35 U.S.C. §371 of International Application No. PCT/JP2007/060201, filed on May 18, 2007, which in turn claims the benefit of Japanese Application No. 2006-140011, filed on May 19, 2006, the disclosures of which Applications are incorporated by reference herein.

TECHNICAL FIELD

The present invention relates to a non-aqueous electrolyte secondary battery, and particularly to an improvement of a separator and a non-aqueous electrolyte for use in the non-aqueous electrolyte secondary battery.

BACKGROUND ART

In recent years, in non-aqueous electrolyte secondary batteries, lithium ion secondary batteries having a high voltage and a high energy density have been actively studied. In general, in lithium ion secondary batteries, a lithium-containing transition metal oxide such as $LiCoO_2$ is used as a positive electrode active material, a carbon material is used as a negative electrode active material, and a porous film made of polyethylene or polypropylene is used as a separator. A non-aqueous electrolyte generally includes a non-aqueous solvent and a solute dissolved therein. For the non-aqueous solvent, a cyclic carbonic acid ester, a chain carbonic acid ester, a cyclic carboxylic acid ester, and the like are used, and for the solute, lithium hexafluorophosphate ($LiPF_6$), lithium tetrafluoroborate ($LiBF_4$), and the like are used.

Various attempts have been made to improve the positive electrode active material, the negative electrode active material, the separator, and the non-aqueous electrolyte, for the purpose of improving the battery characteristics. With respect to the separator, for example, the following improvements have been made.

Patent Document 1 suggests, in order to further improve the safety of batteries in the event of short circuit or in abnormal use, using a separator formed by laminating a porous film made of fluorocarbon resin such as polytetrafluoroethylene (PTFE), and a polyethylene or polypropylene film. In Patent Document 1, since the separator includes a fluorocarbon resin film having a high melting point, the melting of the separator in the event of abnormal heat generation can be prevented. As such, the safety of batteries can be further improved.

Patent Document 2 suggests, in order to further improve the safety of batteries including a metallic lithium as the negative electrode active material, using a separator comprising two layers having different pore sizes. The layer having a smaller pore size prevents the dendritic growth of the metallic lithium, and as a result, an internal short circuit that may occur during charge and discharge and an ignition that may occur in association with the internal short circuit can be prevented. Specifically, Patent Document 2 discloses a separator formed by laminating a polytetrafluoroethylene film and a polypropylene film having a small pore size.

On the other hand, with respect to the non-aqueous electrolyte, for example, the following improvements have been made.

In Patent Document 3, by adding fluorinated benzenes into the non-aqueous electrolyte, the cycle performance is improved.

Patent Document 4 suggests using monofluoroethylene carbonate as the non-aqueous solvent of the non-aqueous electrolyte. In Patent Document 4, since a stable coating film derived from monofluoroethylene carbonate is formed on the negative electrode, the improvement in cycle performance is achieved.

Patent Document 1: Japanese Laid-Open Patent Publication No. Hei 5-205721
Patent Document 2: Japanese Laid-Open Patent Publication No. Hei 5-258741
Patent Document 3: Japanese Laid-Open Patent Publication No. 2005-340026
Patent Document 4: Japanese Laid-Open Patent Publication No. 2004-063432

DISCLOSURE OF THE INVENTION

Problem To be Solved by the Invention

When a lithium-containing transition metal oxide is stored under high voltage and high temperature, leaching of metals constituting the metal oxide occurs intensively. Consequently, metal atoms leached from the lithium-containing transition metal oxide are deposited on the negative electrode, causing an increase in the impedance of the negative electrode or a clogging of the separator. For this reason, the rate performance after storage of a battery including a lithium-containing transition metal oxide as the positive electrode active material is deteriorated.

Moreover, even in the case where the non-aqueous solvent includes fluorinated benzene as suggested in Patent Document 3, or monofluoroethylene carbonate as suggested in Patent Document 4, it is impossible to prevent the leaching of metal atoms from a lithium-containing transition metal oxide as described above. Consequently, as in the foregoing, the rate performance after storage is deteriorated.

In view of the above, the present invention intends to provide a non-aqueous electrolyte secondary battery capable of suppressing the deterioration in the rate performance when stored, particularly when stored under high voltage and high temperature.

Means for Solving the Problem

A non-aqueous electrolyte secondary battery of the present invention includes a positive electrode including an active material absorbing and desorbing lithium ions, a negative electrode including an active material absorbing and desorbing lithium ions, a separator interposed between the positive electrode and the negative electrode, and a non-aqueous electrolyte. The separator includes a material containing a substituent group with electron-withdrawing property. The non-aqueous electrolyte includes a non-aqueous solvent and a solute dissolved therein. The non-aqueous solvent includes a first solvent of at least one selected from the group consisting of a fluorine-containing aromatic solvent, a fluorine-containing cyclic carbonic acid ester, and a fluorine-containing cyclic carboxylic acid ester. It is preferable that the non-aqueous solvent includes at least one selected from the group consisting of a fluorine-containing aromatic solvent and a fluorine-containing cyclic carbonic acid ester. It is preferable that the material containing a substituent group with electron-withdrawing property includes fluorine atoms. It is further preferable that the foregoing material is polytetrafluoroethylene. It is preferable that the separator further includes an inorganic filler.

It is preferable that a reduction resistant film or a reduction resistant layer including an inorganic filler is provided between the separator and the negative electrode.

It is preferable that the content of the first solvent is 10 vol % or more of the non-aqueous solvent.

It is preferable that the active material included in the positive electrode contains $Li[Ni_{1/2}Mn_{3/2}]O_4$.

The present invention further relates to a system comprising the foregoing non-aqueous electrolyte secondary battery, and a charger for charging the non-aqueous electrolyte secondary battery, wherein the end-of-charge voltage in the charger is set at 4.3 to 4.6 V.

EFFECT OF THE INVENTION

In the present invention, a constituent material of the separator contains a substituent group with electron-withdrawing property. In such a material, since electrons are not localized, the electrons are not easily withdrawn therefrom, and the oxidation resistance is improved. Consequently, the oxidation decomposition of the separator can be inhibited. In addition, since the non-aqueous solvent includes at least one solvent selected from the group consisting of a fluorine-containing aromatic solvent, a fluorine-containing cyclic carbonic acid ester, and a fluorine-containing cyclic carboxylic acid ester, the improvement in wettability of the separator with the electrolyte is made possible. As a result, the voltage is smoothed in an entire electrode plate assembly, and the prevention of oxidation decomposition of the non-aqueous solvent is also made possible.

One of the causes to deteriorate the rate performance of the battery is presumably in that metal atoms other than lithium are leached out into the non-aqueous electrolyte as cations from the positive electrode active material, and the metal is deposited on the negative electrode. In the prevent invention, even when the battery is stored under high voltage and high temperature, the oxidation decomposition of the separator and the non-aqueous solvent can be inhibited. Consequently, it can be prevented that electrons generated during oxidation decomposition move to metal atoms (other than lithium) contained in the positive electrode active material and combine with the metal atoms to form cations, and the cations are dissolved in the non-aqueous electrolyte. For this reason, it becomes possible to suppress the deterioration in the rate performance of the battery even when the battery is stored, particularly when the battery is stored under high voltage and high temperature.

BEST MODE FOR CARRYING OUT THE INVENTION

Figure 1:
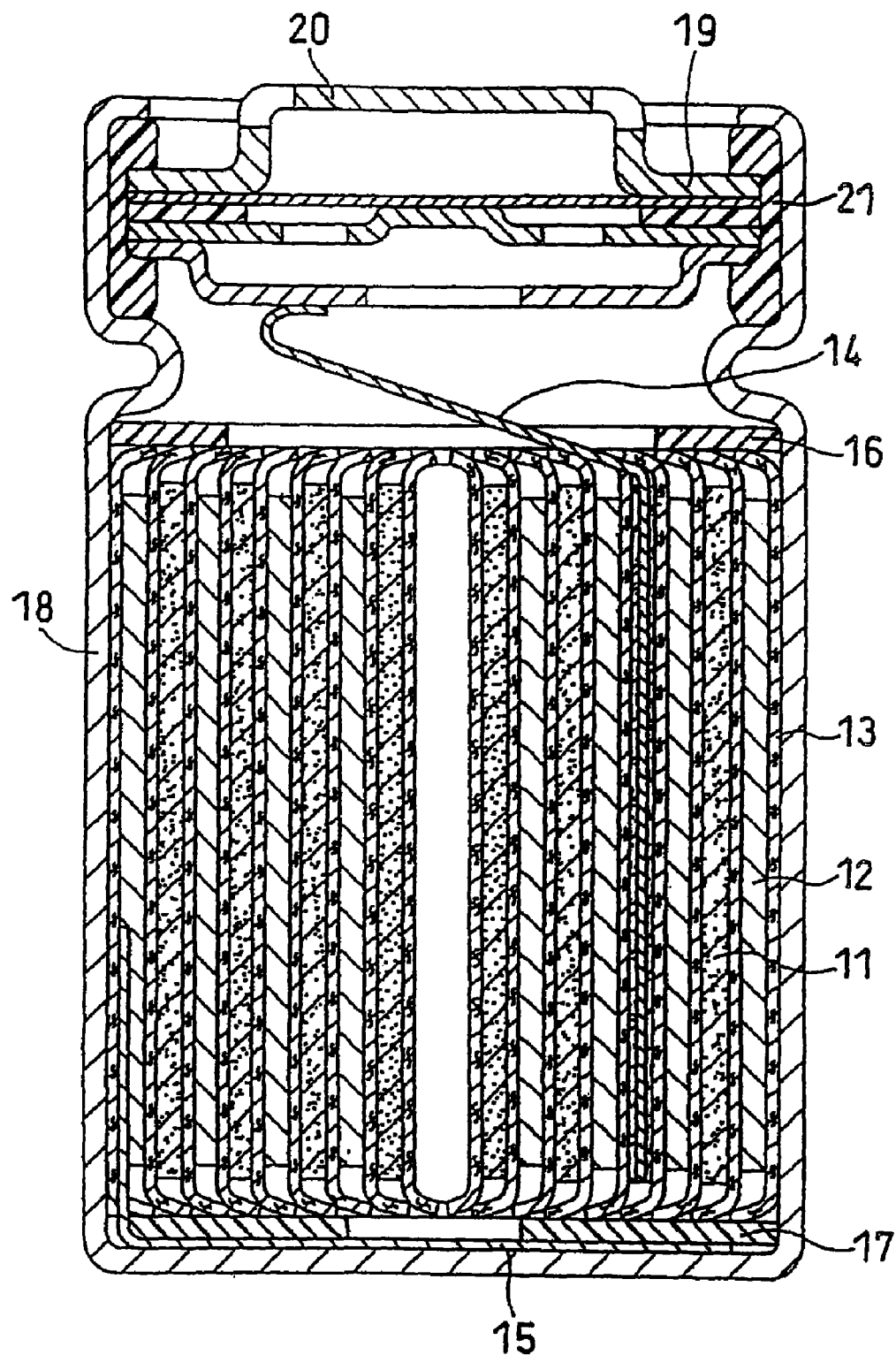
FIG. 1 A schematic longitudinal sectional view showing a cylindrical non-aqueous electrolyte secondary battery fabricated in Examples.

The best mode for carrying out the present invention is described below in detail.

The non-aqueous electrolyte secondary battery of the present invention includes a positive electrode including an active material absorbing and desorbing lithium ions, a negative electrode including an active material absorbing and desorbing lithium ions, a separator interposed between the positive electrode and the negative electrode, and a non-aqueous electrolyte. The separator includes a material containing a substituent group with electron-withdrawing property. The non-aqueous electrolyte includes a non-aqueous solvent and a solute dissolved therein. The non-aqueous solvent includes a first solvent of at least one selected from the group consisting of a fluorine-containing aromatic solvent, a fluorine-containing cyclic carbonic acid ester, and a fluorine-containing cyclic carboxylic acid ester.

In general, in lithium ion secondary batteries, a separator made of polyethylene (PE) or polypropylene (PP) is used. However, since the oxidation resistance of polyethylene and polypropylene is low, when a battery including a separator made of such a material is stored under high voltage and high temperature, the separator is decomposed by oxidation. At this time, metal atoms other than lithium in the positive electrode active material receive electrons generated by oxidation decomposition of the separator, and are reduced. The metal atoms having received electrons are leached from the positive electrode active material as metal cations. One of the reasons for the low oxidation resistance of polyethylene and polypropylene is presumably in that a large number of hydrogen atoms, from which electrons are easily withdrawn, are contained in the molecules of polyethylene and polypropylene.

In order to inhibit the oxidation decomposition of the separator, it is effective to use a material containing a substituent group with electron-withdrawing property in its molecules, such as polytetrafluoroethylene (PTFE) and polychlorotrifluoroethylene (PCTFE). It is considered that in PTFE or PCTFE constituting the separator, since electrons are not localized because of the strong electron-withdrawing property of halogen atoms, the electrons are not easily withdrawn, and the oxidation resistance is improved.

However, the separator including a material containing a substituent group with electron-withdrawing property, because of its strong polarity, has poor wettability with the non-aqueous electrolyte. If there is a portion on the separator where it is not wet with the non-aqueous electrolyte, the voltage across the portions on the positive electrode and the negative electrode opposite to each other with the portion sandwiched therebetween (potential difference) is locally increased. When the voltage is increased as above, the non-aqueous solvent is decomposed by oxidation under high temperature storage, and the electrons generated by the oxidation decomposition move to metal atoms other than lithium contained in the positive electrode active material. This poses a problem that metal cations are leached from the positive electrode active material.

In order to prevent the oxidation decomposition of the separator as described above, it is extremely effective that the non-aqueous solvent includes a first solvent of at least one selected from the group consisting of a fluorine-containing aromatic solvent, a fluorine-containing cyclic carbonic acid ester, and a fluorine-containing cyclic carboxylic acid ester, and the separator includes a material containing a substituent group with electron-withdrawing property. The first solvent included in the non-aqueous solvent, because of its function to lower the surface tension of the non-aqueous solvent, improves the wettability of the separator including a material containing a substituent group with electron-withdrawing property with the non-aqueous electrolyte. This suppresses the local increase in voltage and smoothes the voltage in the entire electrode plate assembly. The oxidation decomposition of the non-aqueous solvent can therefore be suppressed even when the battery is stored under high voltage and high temperature. In addition, the separator used in the present invention has a high oxidation resistance because the constituent material thereof includes a substituent group with electron-withdrawing property. The oxidation decomposition of the separator can therefore be inhibited even when the battery is stored under high voltage and high temperature.

The dual effects as described above make it possible to prevent the leaching of metal cations from the positive electrode, and to suppress the deterioration in the rate performance.

It should be noted that in Patent Documents 1 and 2, a film made of PTFE is used as the separator. However, by merely using the film made of PTFE, the leaching of metal cations from the positive electrode due to the oxidation reduction of the non-aqueous solvent occurs. For this reason, the rate performance of the battery after storage is deteriorated.

Even in the cases where fluorinated benzene is included in the non-aqueous electrolyte as in Patent Document 3, and monofluoroethylene carbonate is included in the non-aqueous electrolyte as in Patent Document 4, it is impossible to prevent the leaching of metal cations from the positive electrode active material due to the oxidation decomposition of the separator. For this reason, in these cases also, the rate performance of the battery after storage is deteriorated.

The constituent material of the separator includes a substituent group with electron-withdrawing property. Examples of the substituent group with electron-withdrawing property include, for example, —F, —Cl, —CN, —$SO_2$—, —CO—, —COO—, —$CF_3$, and the like.

A preferred material including the substituent group with electron-withdrawing property is a polymer including a substituent group with electron-withdrawing property, and is exemplified by, for example, polytetrafluoroethylene, polychlorotrifluoroethylene, tetrafluoroethylene-perfluoroalkyl vinylether copolymer, tetrafluoroethylene-hexafluoropropylene copolymer, polyamide, polyimide, polyamide-imide, polyetherimide, polyarylate, polysulfone, polyethersulfone, polyetheretherketone, polyethylene terephthalate, polybutylene terephthalate, acrylonitrile-styrene-acrylate copolymer, a polymer containing acrylonitrile units, and the like.

It is particularly preferable that the separator includes a material having a substituent group containing fluorine such as —F or —$CF_3$ in its molecules. The fluorine atoms, because of their high electron-withdrawing property, improve the oxidation resistance of the separator, making it possible to inhibit the oxidation decomposition more effectively.

Among the foregoing materials, a fluorine polymer such as polytetrafluoroethylene (PTFE) is preferred because of the following reason. Polytetrafluoroethylene contains four fluorine atoms with high electron-withdrawing property in its repeating unit. As such, in polytetrafluoroethylene, electrons are not localized on the fluorine atoms. Therefore, the electrons are not easily withdrawn from polytetrafluoroethylene, and the oxidation resistance is remarkably improved.

It is more preferable that the separator is an insulating layer including a material containing a substituent group with electron-withdrawing property and including an inorganic filler. Such an insulating layer has a strong reduction resistance because it includes an inorganic filler. The reduction decomposition of the separator as described below can therefore be prevented.

In the case where the separator is an insulating layer including a material containing a substituent group with electron-withdrawing property and including an inorganic filler, the material containing a substituent group with electron-withdrawing property, although not being particularly limited, is preferably a polymer containing acrylonitrile units. The content of acrylonitrile units in the foregoing polymer is preferably 20 mol % or more. Examples of the polymer containing acrylonitrile units include, for example, polyacrylonitrile, modified polyacrylonitrile rubber, acrylonitrile-styrene-acrylate copolymer, and the like.

By using a polymer containing acrylonitrile units as the foregoing material, the dispersibility of the foregoing material and the inorganic filler in the insulating layer can be improved, and the reduction decomposition of the separator can be suppressed more effectively.

The content of the inorganic filler is preferably 80 to 99 wt % of the insulating layer. When the content of the inorganic filler is less than 80 wt %, the gaps in the interior of the insulating layer is decreased, and the lithium ion conductivity may be lowered. When the content of the inorganic filler is more than 99 wt %, the strength of the insulating layer itself may be lowered.

Examples of the inorganic filler include alumina, titania, zirconia, magnesia, silica, and the like.

It should be noted that in the case where the separator includes the foregoing insulting layer, the separator may be composed of the foregoing insulting layer alone. Alternatively, the separator may include, in addition to the foregoing insulating layer, a porous film made of a known material in the art.

The thickness of the separator is preferably 0.5 to 300 μm. This applies to the case where the separator is formed of the insulating layer as described above.

It is preferable that the separator including a material containing a substituent group with electron-withdrawing property is arranged so as not to be in direct contact with the negative electrode. The foregoing separator has a high oxidation resistance, but the reduction resistance thereof tends to be slightly deteriorated. For this reason, if the potential of the negative electrode is significantly decreased, there may be a possibility that a portion that is in contact with the negative electrode on the separator is easily reduced.

In order to prevent the reduction of the separator including a material containing a substituent group with electron-withdrawing property, it is preferable to arrange a reduction resistant film or a reduction resistant layer including an inorganic filler between the negative electrode and the separator.

Examples of the reduction resistant film include, for example, a polyolefin film, and a polyethylene film, and the like. Examples of the reduction resistant layer include, for example, a layer including an inorganic filler and a predetermined polymer, and the like. The reduction resistant layer may be formed on a face opposite to the separator in the negative electrode, or alternatively, on a face opposite to the negative electrode in the separator. As the inorganic filler, the materials as described above may be used. The type of the polymer included in the reduction resistance layer is not particularly limited. For example, in the case of using the separator made of a material containing a substituent group with electron-withdrawing property, such as a fluorocarbon polymer, the reduction resistance layer may be provided between the negative electrode and the separator. In this case, as the reduction resistance layer, the insulating layer as described above may be used.

The thicknesses of the reduction resistant film and the reduction resistant layer including an inorganic filler are preferably 0.5 to 25 μm. When the thicknesses of the reduction resistant film and the reduction resistant layer are less than 0.5 μm, for example, if the non-aqueous electrolyte secondary battery includes a wound-type electrode assembly, the reduction resistant film or the reduction resistant layer is crushed by the pressure applied thereto at the time of winding, which may bring the separator and the negative electrode into contact with each other. This may makes the effect of the separator of suppressing the reduction insufficient. When the thicknesses of the reduction resistant film and the reduction resistant layer are more than 25 μm, the output performance may be deteriorated because of an extremely large DC resistance.

An example of a method of fabricating a separator is described below.

For example, a polymer containing a substituent group with electron-withdrawing property is mixed with an organic solvent. The polymer is melted and kneaded, extrusion-molded, and then subjected to drawing, removing of the organic solvent, drying, and thermosetting, whereby a separator can be obtained.

For example, a separator can be obtained by the method as described below.

First, the polymer and a good solvent for the polymer are mixed to prepare a solution of the polymer.

The polymer solution serving as a starting material can be prepared by, for example, heating and dissolving the polymer in a predetermined solvent. No particular limitation is imposed on the solvent as long as it can dissolve the polymer sufficiently. Examples of the solvent include, for example, aliphatic or cyclic hydrocarbons such as nonane, decane, undecane, dodecane, and liquid paraffin, mineral oil fractions having a boiling point at the same level as the boiling points of these hydrocarbons, and the like. In order to improve the stability of a gel-like molded material obtained after the extrusion-molding, it is preferable to use a nonvolatile solvent such as a liquid paraffin.

The heating and dissolving may be performed while the polymer is being stirred at a temperature at which the polymer is completely dissolved in the solvent, or while the polymer is being mixed uniformly in an extruder. In the case where the dissolving is performed while the polymer is being stirred in the solvent, the heating temperature, although varied depending on the types of the polymer and the solvent to be used, is usually in a range of 140 to 250° C.

In the case where the dissolving is performed in an extruder, first, the polymer is supplied to the extruder, and then melted. The melting temperature, although varied depending on the type of the polymer to be used, is preferably 30 to 100° C. higher than the melting point of the polymer.

Subsequently, a predetermined solvent is supplied to this molten polymer. In such a manner, a solution containing molten polymer can be obtained.

Next, this solution is extruded into a sheet through the dies on the extruder, and then cooled to obtain a gel-like composite. It should be noted that in the case where the polymer solution is prepared in the extruder, the solution may be extruded from the extruder through dies and the like, or the solution may be transferred to another extruder and extruded through dies and the like.

Subsequently, by performing cooling, a gel-like molded material is formed. The cooling is performed by cooling the dies or cooling the gel-like sheet. It is preferable to cool down to 90° C. or less at a rate of at least 50° C./min, and more preferable to cool down to 80 to 30° C. As a method of cooling the gel-like sheet, it is possible to use a method of bringing the gel-like sheet into direct contact with a cooling medium such as cold air or cooling water, a method of bringing the gel-like sheet into contact with a roller cooled with a cooling medium, and other methods. Among these, a method of using a cooling roller is preferred.

Next, this gel-like molded material is subjected to biaxial drawing to obtain a molded material. The drawing is performed at a predetermined magnification after the gel-like molded material is heated, with a typical method such as a tenter method, a roll method, and a rolling method, or a combination of these methods. The biaxial drawing may be either one of a lengthwise and crosswise simultaneous drawing and a sequential drawing, but a simultaneous biaxial drawing is particularly preferred.

The molded material obtained in the manner as described above is washed with a washing agent to remove the residual solvent. As the washing agent, it is possible to use an easily volatile solvent, which is exemplified by hydrocarbons such as pentane, hexane and heptane, chlorinated hydrocarbons such as methylene chloride and carbon tetrachloride, fluorocarbons such as trifluoroethane, ethers such as diethyl ether and dioxin, and the like. These may be used singly or in combination of two or more. It should be noted that from the above, one or more suitable ones are selected as the washing agent depending on the solvent used for dissolving the polymer.

Examples of the method for washing the molded material include, for example, a method of immersing the molded material in a predetermined washing agent to extract the residual solvent, a method of showering the washing agent to the molded material, a method using these in combination, and the like. It is preferable to wash the molded material until the content of residual solvent in the molded material becomes less than 1 wt %.

Thereafter, the molded material is dried to remove the washing agent. The drying can be performed, for example, with the use of a method of heat drying, air drying, and the like.

Lastly, the molded material after the drying is subjected to thermosetting at a temperature of 100° C. or more, whereby a separator which is a microporous film with high strength can be obtained.

The first solvent includes at least one selected from the group consisting of a fluorine-containing aromatic solvent, a fluorine-containing cyclic carbonic acid ester, and a fluorine-containing cyclic carboxylic acid ester.

Examples of the fluorine-containing aromatic solvents include, for example, fluorobenzene, 1,2-difluorobenzene, 1,2,3-trifluorobenzene, 1,2,3,4-tetrafluorobenzene, pentafluorobenzene, hexafluorobenzene, 2-fluorotoluene, and α,α,α-trifluorotoluene. Among these, fluorobenzene and hexafluorobenzene are preferred.

Examples of the fluorine-containing cyclic carbonic acid ester include, for example, fluoroethylene carbonate, difluoroethylene carbonate, trifluoroethylene carbonate, tetrafluoroethylene carbonate, and trifluoropropylene carbonate. Among these, fluoroethylene carbonate and trifluoropropylene carbonate are preferred.

Examples of the fluorine-containing cyclic carboxylic acid ester include, for example, α-fluoro-γ-butyrolactone, α,α-difluoro-γ-butyrolactone, α-fluoro-γ-valerolactone, and α,α-difluoro-γ-valerolactone.

Among the above, it is preferable that the first solvent includes at least one selected from the group consisting of a fluorine-containing aromatic solvent and a fluorine-containing cyclic carbonic acid ester. These solvents can significantly lower the surface tension of the non-aqueous electrolyte. Consequently, the wettability of the separator including a material containing a substituent group with electron-withdrawing property with the non-aqueous electrolyte improves, and the local increase in voltage is suppressed, and the voltage is smoothed. For this reason, the oxidation decomposition of the non-aqueous solvent can be inhibited even when the battery is stored under high voltage and high temperature.

Above all, it is further preferable to use, as the first solvent, at least one selected from the group consisting of fluorobenzene, hexafluorobenzene, fluoroethylene carbonate, and trifluoropropylene carbonate.

The content of the first solvent is preferably 10 vol % or more of the non-aqueous solvent, and more preferably 20 vol % or more. When the content of first solvent is less than 10 vol %, the function of the non-aqueous solvent to lower the surface tension is weakened. As a result, the wettability of the separator including a material containing a substituent group with electron-withdrawing property with the non-aqueous electrolyte becomes nonuniform, and the oxidation decomposition of the non-aqueous solvent due to a local increase in voltage may occur. In the case where the first solvent includes two or more of the foregoing solvents, it will suffice if the total content of these is 10 vol % or more.

The content of the first solvent is preferably 50 vol % or less of the non-aqueous solvent, and more preferably 40 vol % or less. In the case of a fluorine-containing cyclic carbonic acid ester and a fluorine-containing cyclic carboxylic acid ester, since these solvents have a high dielectric constant and a high viscosity, when the content of these solvents exceeds 50 vol %, the lithium ion conductivity of the non-aqueous electrolyte is lowered, and as a result, the rate performance of the battery may be deteriorated. The fluorine-containing aromatic solvent itself does not have a function to easily dissociate a lithium salt such LiPF$_6$. Therefore, when the content of fluorine-containing aromatic solvent exceeds 50 vol %, there may be a possibility that a lithium salt is deposited. It should be noted that in the case where the first solvent includes a fluorine-containing cyclic carbonic acid ester or a fluorine-containing cyclic carboxylic acid ester, and a fluorine-containing aromatic solvent, the upper limit of the content of the first solvent may exceed 50 vol %.

The non-aqueous solvent preferably includes a second solvent other than the foregoing first solvent. Examples of the second solvent include, for example, a cyclic carbonic acid ester, a chain carbonic acid ester, a cyclic carboxylic acid ester, and the like. The cyclic carbonic acid ester is exemplified by propylene carbonate (PC), ethylene carbonate (EC), and the like. The chain carbonic acid ester is exemplified by diethyl carbonate (DEC), ethyl methyl carbonate (EMC), dimethyl carbonate (DMC), and the like. The cyclic carboxylic acid ester is exemplified by γ-butyrolactone (GBL), γ-valerolactone (GVL), and the like.

The content of the second solvent is preferably 90 vol % or less of the non-aqueous solvent, and more preferably 60 vol % or less.

In the present invention, it is preferable to combine a separator including polytetrafluoroethylene or a separator including a material containing a substituent group with electron-withdrawing property and including an inorganic filler, and a non-aqueous electrolyte including a non-aqueous solvent of at least one selected from the group consisting of a fluorine-containing aromatic solvent and a fluorine-containing carbonic acid ester.

It is more preferable to combine a separator including a material containing a substituent group with electron-withdrawing property and including an inorganic filler, and a non-aqueous electrolyte including a non-aqueous solvent of at least one selected from the group consisting of a fluorine-containing aromatic solvent and a fluorine-containing carbonic acid ester. It is particularly preferable to combine a separator including a material containing a substituent group with electron-withdrawing property and including an inorganic filler, and a non-aqueous electrolyte including a non-aqueous solvent of at least one selected from the group consisting of fluorobenzene, hexafluorobenzene, fluoroethylene carbonate, and trifluoropropylene carbonate.

As the solute to be dissolved in the non-aqueous solvent, it is possible to use a typical solute in the art. For example, LiPF$_6$, LiClO$_4$, LiBF$_4$, LiAlCl$_4$, LiSbF$_6$, LiSCN, LiCF$_3$SO$_3$, LiCF$_3$CO$_2$, Li(CF$_3$SO$_2$)$_2$, LiAsF$_6$, LiB$_{10}$Cl$_{10}$, lithium lower aliphatic carboxylate, LiCl, LiBr, LiI, chloroborane lithium such as Li$_2$B$_{10}$Cl$_{10}$, borates such as lithium bis(1,2-benzenediolate(2-)-O,O') borate, lithium bis(2,3-naphthalenediolate (2-)-O,O') borate, lithium bis(2,2'-biphenyldiolate(2-)-O,O') borate, and lithium bis(5-fluoro-2-olate-1-benzenesulfonate-O,O') borate, and imides such as lithium bis(trifluoromethane)sulfonylimide ((CF$_3$SO$_2$)$_2$NLi), lithium trifluoromethane sulfonyl nonafluorobutane sulfonylimide (LiN (CF$_3$SO$_2$) (C$_4$F$_9$SO$_2$)), and lithium bis(pentafluoroethane) sulfonylimide ((C$_2$F$_5$SO$_2$)$_2$NLi) may be used. These may be used singly or in combination of two or more.

Moreover, it is preferable to include a cyclic carbonic acid ester having at least one carbon-carbon unsaturated bond in the non-aqueous electrolyte. It is preferable because such a cyclic carbonic acid ester is decomposed on the negative electrode to form a coating film with high lithium ion conductivity, which makes it possible to enhance the charge/discharge efficiency. The content of the cyclic carbonic acid ester having at least one carbon-carbon unsaturated bond is preferably 10 vol % or less of the non-aqueous solvent.

Examples of the cyclic carbonic acid ester having at least one carbon-carbon unsaturated bond include, for example, vinylene carbonate, 4-methyl vinylene carbonate, 4,5-dimethyl vinylene carbonate, 4-ethyl vinylene carbonate, 4,5-diethyl vinylene carbonate, 4-propyl vinylene carbonate, 4,5-dipropyl vinylene carbonate, 4-phenyl vinylene carbonate, 4,5-diphenyl vinylene carbonate, vinyl ethylene carbonate, and divinyl ethylene carbonate. These may be used singly or in combination of two or more. Among these, at least one selected from the group consisting of vinylene carbonate, vinyl ethylene carbonate, and divinyl ethylene carbonate is preferred.

The non-aqueous electrolyte may further include a known benzene derivative that is decomposed during overcharge to form a coating film on the electrode, thereby inactivates the battery. As the foregoing benzene derivative, a compound having a phenyl group and a cyclic compound group adjacent to the phenyl group are preferred. As the cyclic compound group, a phenyl group, a cyclic ether group, a cyclic ester group, a cycloalkyl group, a phenoxy group are preferred. The benzene derivative is specifically exemplified by cyclohexylbenzene, biphenyl, diphenyl ether, and the like. These may be used singly or in combination of two or more. The content of the benzene derivative is preferably 10 vol % or less of the non-aqueous solvent.

The positive electrode includes, for example, a positive electrode current collector and a positive electrode active material layer carried thereon. The positive electrode active material layer includes a positive electrode active material capable of absorbing and desorbing lithium ions, a binder, a conductive agent, and the like.

As the positive electrode active material, it is possible to use, for example, Li$_x$CoO$_2$, Li$_x$NiO$_2$, Li$_x$MnO$_2$, Li$_x$Co$_y$Ni$_{1-y}$O$_2$, Li$_x$Co$_y$M$_{1-y}$O$_z$, Li$_x$Ni$_{1-y}$M$_y$O$_z$, Li$_x$Mn$_2$O$_4$, and Li$_x$Mn$_{2-y}$M$_y$O$_4$, where M is at least one selected from the group consisting of Na, Mg, Sc, Y, Mn, Fe, Co, Ni, Cu, Zn, Al, Cr, Pb, Sb, and B, x=0 to 1.2, y=0 to 0.9, and z=2.0 to 2.3. These may be used singly or in combination of two or more. It should be noted that the value x representing a molar ratio of lithium is a value immediately after the production of the active material, and is increased or decreased through charge and discharge.

Above all, as the positive electrode active material, it is preferable to use Li[Ni$_{1/2}$Mn$_{3/2}$]O$_4$ because this provides a battery having a voltage as high as approximately 5 V.

The negative electrode includes, for example, a negative electrode current collector and a negative electrode active material layer carried thereon. The negative electrode active material layer includes a negative electrode active material capable of absorbing and desorbing lithium ions, a binder, and, as needed, a conductive agent and the like. For the negative electrode active material, it is possible to use, for example, graphites such as natural graphite (flake graphite etc.) and artificial graphite, carbon blacks such as acetylene black, Ketjen Black, channel black, furnace black, lampblack, and thermal black, a carbon fiber, a metal fiber, an alloy, a lithium metal, a tin compound, a silicon compound, and a nitride.

For the binder to be used in the positive electrode and the negative electrode, for example, polyethylene, polypropylene, polytetrafluoroethylene (PTFE), polyvinylidene fluoride (PVDF), tetrafluoroethylene-hexafluoropropylene copolymer (FEP), vinylidene fluoride-hexafluoropropylene copolymer, and the like are used. Here, it is preferable that the binder to be added to the positive electrode contains fluorine atoms, and the binder to be added to the negative electrode does not contain fluorine atoms.

For the conductive agent to be included in the electrodes, for example, graphites, carbon blacks such as acetylene black, Ketjen Black, channel black, furnace black, lampblack, and thermal black, a carbon fiber, and a metal fiber are used.

For the positive electrode current collector, for example, a sheet made of stainless steel, aluminum, titanium, or the like is used. For the negative electrode current collector, for example, a sheet made of stainless steel, nickel, cupper, or the like is used. The thickness of the positive electrode current collector and the negative electrode current collector, although not particularly limited, is typically 1 to 500 μm.

It is preferable that the end-of-charge voltage of the non-aqueous electrolyte secondary battery of the present invention in a normal operating state is set at 4.3 to 4.6 V. In other words, it is preferable that in a system comprising the non-aqueous electrolyte secondary battery of the present invention and a charger for charging the same (e.g., a cellular telephone and a personal computer), the end-of-charge voltage in the charger is set at 4.3 to 4.6 V.

Figure 2:
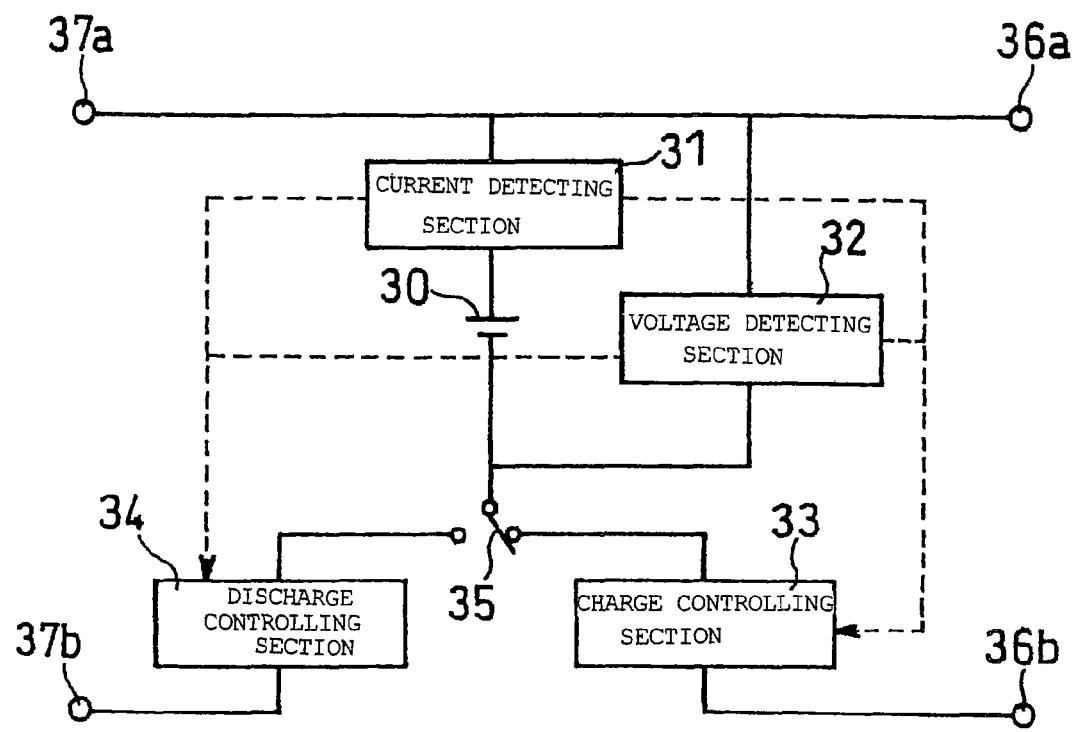
FIG. 2 A block diagram showing a configuration of a charger with a non-aqueous electrolyte secondary battery of the present invention mounted therein.

FIG. 2 illustrates a block diagram showing an example of a configuration of a charger for controlling the charge of a battery. The charger shown in FIG. 2 also includes a discharge controller.

In this charger, a non-aqueous electrolyte secondary battery 30 of the present invention and a current detecting section 31 are connected in series. A voltage detecting section 32 is connected in parallel to the circuit in which the battery 30 and the current detecting section 31 are connected in series.

This charger further includes input terminals 36a and 36b for charging the battery 30, and output terminals 37a and 37b to be connected to equipment. Moreover, this charger includes a select switch 35 connected in series to the battery 30. The switch 35 is turned to the side of a charge controlling section 33 for charge, and turned to the side of a discharge controlling section 34 for discharge.

In the case of using a positive electrode active material such as LiCoO$_2$, the degree of expansion of the positive electrode active material is increased as the end-of-charge voltage is set higher. By virtue of this, the non-aqueous electrolyte is allowed to easily enter the interior of the electrode, and the contact between the positive electrode and the non-aqueous electrolyte is improved. Consequently, the local increase in voltage is suppressed, and the voltage is smoothed.

When the end-of-charge voltage is lower than 4.3 V, since the degree of expansion of the positive electrode active material is low, only a small amount of non-aqueous electrolyte can enter the interior of the electrolyte. The charge reaction therefore proceeds on the surface of the electrode more intensively than in the interior, causing a local increase in voltage. Consequently, the non-aqueous solvent is decomposed by oxidation, and the metal cations may be leached from the positive electrode active material. When the end-of-charge voltage is higher than 4.6 V, a local increase in voltage can be suppressed, but the oxidation decomposition of the non-aqueous solvent occurs because of the excessively high voltage, which may cause a leaching of metal cations from the positive electrode active material.

EXAMPLES

Example 1

Batteries 1 to 22

(i) Preparation of Non-aqueous Electrolyte

In a mixture solvent as shown in Table 1, LiPF$_6$ was dissolved in a concentration of 1.0 mol/L, to prepare non-aqueous electrolytes Nos. 1 to 22. Acronyms of the first solvent used shown in Table 1 are as follows.

FB: Fluorobenzene
DFB: 1,2-difluorobenzene
TriFB: 1,2,3-trifluorobenzene
TeFB: 1,2,3,4-tetrafluorobenzene
PFB: Pentafluorobenzene
HFB: Hexafluorobenzene
FT: 2-fluorotoluene
TFT: α,α,α-trifluorotoluene
FEC: Fluoroethylene carbonate
DFEC: Difluoroethylene carbonate
TriFEC: Trifluoroethylene carbonate
TeFEC: Tetrafluoroethylene carbonate
TFPC: Trifluoropropylene carbonate
FGBL: α-fluoro-γ-butyrolactone
DFGBL: α,α-difluoro-γ-butyrolactone
FGVL: α-fluoro-γ-valerolactone
DFGVL: α,α-difluoro-γ-valerolactone Acronyms of the second solvent used are as follows.
EC: Ethylene carbonate
EMC: Ethyl methyl carbonate
DMC: Dimethyl carbonate
DEC: Diethyl carbonate (ii) Separator A separator made of polytetrafluoroethylene (PTFE) (BSP0105565-3 available from W. L. Gore & Associates, Inc.) was used. The thickness of the separator was 54 μm, and the porosity thereof was 61%.

(iii) Fabrication of Positive Electrode Plate 85 parts by weight of lithium cobalt oxide powder, 10 parts by weight of acetylene black as a conductive agent, and 5 parts by weight of polyvinylidene fluoride resin serving as a binder were mixed. This mixture was dispersed into dehydrated N-methyl-2-pyrrolidone, whereby a positive electrode material mixture slurry was prepared. This positive electrode material mixture was applied onto both faces of a positive electrode current collector (thickness: 15 μm) made of an aluminum foil and then dried and rolled to give a positive electrode plate (thickness: 160 μm).

(iv) Fabrication of Negative Electrode Plate 100 parts by weight of artificial graphite powder, 1 part by weight of polyethylene resin serving as a binder, and 1 part by weight of carboxymethyl cellulose serving as a thickener were mixed. To this mixture, an appropriate amount of water was added and kneaded, whereby a negative electrode material mixture slurry was prepared. This negative electrode material mixture was applied onto both faces of a negative electrode current collector made of a copper foil (thickness: 10 μm) and then dried and rolled to give a negative electrode plate (thickness: 160 μm).

(v) Production of Cylindrical Battery

A cylindrical battery as shown in FIG. 1 was assembled.

A positive electrode plate 11, a negative electrode plate 12, and a separator 13 interposed between the positive electrode plate 11 and the negative electrode plate 12 were wound into a coil to fabricate an electrode plate assembly. The electrode plate assembly was housed in a nickel-plated battery case 18 made of iron. One end of a positive electrode lead 14 made of aluminum was connected to the positive electrode plate 11, and the other end of the positive electrode lead 14 was connected to the back face of a sealing plate 19 electrically connected to a positive electrode terminal 20. One end of a negative electrode lead 15 made of nickel was connected to the negative electrode plate 12, and the other end of the negative electrode lead 15 was connected to the bottom of the battery case 18. On the upper portion and the lower portion of the electrode plate assembly, an upper insulating plate 16 and a lower insulating plate 17 were provided, respectively. A predetermined amount of non-aqueous electrolyte No. 1 (not shown) prepared in the manner as described above was injected into the battery case 18. The opening end of the battery case 18 was crimped onto the sealing plate 19 with a gasket 21 therebetween to seal the opening of the battery case 18, whereby a battery 1 was finished. The design capacity of the battery 1 was 1500 mAh. It should be noted that in the following Examples, the design capacity of the battery was 1500 mAh.

Batteries 2 to 22 were fabricated in the same manner as Battery 1 except that non-aqueous electrolytes Nos. 2 to 22 were used in place of the non-aqueous electrolyte No. 1.

Comparative Example 1

Comparative Battery 1 was fabricated in the same manner as Battery 1 except that non-aqueous electrolyte A obtained by dissolving $LiPF_6$ in a concentration of 1.0 mol/L in a mixture solvent composed of ethylene carbonate (EC) and ethyl methyl carbonate (EMC) (volume ratio 1:4), and a separator made of polyethylene (PE) (Hipore™ available from Asahi Kasei Corporation, thickness: 20 μm) were used.

Comparative Example 2

Comparative Battery 2 was fabricated in the same manner as Battery 1 except that a separator made of polyethylene (PE) (Hipore™ available from Asahi Kasei Corporation, thickness: 20 μm) was used.

Comparative Example 3

Comparative Battery 3 was fabricated in the same manner as Battery 9 except that a separator made of polyethylene (PE) (Hipore™ available from Asahi Kasei Corporation, thickness: 20 μm) was used.

Comparative Example 4

Comparative Battery 4 was fabricated in the same manner as Battery 1 except that non-aqueous electrolyte A obtained by dissolving $LiPF_6$ in a concentration of 1.0 mol/L in a mixture solvent composed of EC and EMC (volume ratio 1:4) was used.

[Evaluation]

(a) Measurement of Amount of Metal Deposited on Negative Electrode after Storage Batteries 1 to 22 and Comparative Batteries 1 to 4 fabricated in the manner as described above were charged at a constant voltage of 4.3 V. The batteries after charge were stored at 85° C. for 72 hours.

Thereafter, the batteries after storage were disassembled, and the center portion of the negative electrode plate was cut out in a size of 2 cm×2 cm. The piece thus obtained was washed three times with ethyl methyl carbonate.

Subsequently, the piece and an acid added thereto were heated to dissolve the piece. Insoluble components were filtered off, and the filtrate was brought to a constant volume to be used as a measurement sample. This measurement sample and an ICP emission spectrophotometer (VISTA-RL available from VARIAN, Inc.) were used to quantitate the amount of metal leached from the positive electrode and deposited on the negative electrode (in this case, the amount of Co). The results are shown in Table 1. In Table 1, the amount of metal deposited (metal deposition amount) is converted into an amount per unit weight of the negative electrode.

(b) Capacity Recovery Rate

First, each battery was subjected to constant-current constant-voltage charge in which charge was performed at a constant current of 1050 mA at 20° C. until the battery voltage reached 4.3 V, and then charge was performed at a constant voltage of 4.3 V for 2.5 hours. Subsequently, the battery after charge was discharged at a discharge current value of 1500 mA (1 C) until the battery voltage dropped to 3.0 V, and a discharge capacity before storage was determined.

Next, the battery after discharge was charged in the same manner as described above. The battery after charge was stored at 85° C. for 72 hours.

The battery after storage was first discharged at a current value of 1 C at 20° C. and then further discharged at a current value of 0.2 C. Subsequently, the battery after discharge was charged in the same manner as described above at a constant current of 1050 mA until the battery voltage reached 4.3 V and then charged at a constant voltage of 4.3 V for 2.5 hours. Thereafter, the battery after charge was discharged at a current value of 1 C until the battery voltage dropped to 3.0 V. The discharge capacity at this time was referred to as a recovery capacity after storage.

The proportion of a recovery capacity after storage relative to a discharge capacity before storage was calculated as a percentage, which was referred to as a capacity recovery rate after storage. The results are shown in Table 1.

It should be noted that the types of the separator used are also shown in Table 1.

TABLE 1

| | Non-aqueous electrolyte | Composition of non-aqueous solvent (volume ratio) | Constituent material of separator | Metal deposition amount after storage (μg/g) | Capacity recovery rate (%) |
|---|---|---|---|---|---|
| Battery 1 | 1 | EC:FB:EMC(1:1:3) | PTFE | 8.9 | 84.0 |
| Battery 2 | 2 | EC:DFB:EMC(1:1:3) | PTFE | 9.3 | 83.0 |
| Battery 3 | 3 | EC:TriFB:EMC(1:1:3) | PTFE | 9.1 | 83.3 |
| Battery 4 | 4 | EC:TeFB:EMC(1:1:3) | PTFE | 9.2 | 83.2 |
| Battery 5 | 5 | EC:PFB:EMC(1:1:3) | PTFE | 9.2 | 83.2 |
| Battery 6 | 6 | EC:HFB:EMC(1:1:3) | PTFE | 9.0 | 83.7 |
| Battery 7 | 7 | EC:FT:EMC(1:1:3) | PTFE | 10 | 82.8 |
| Battery 8 | 8 | EC:TFT:EMC(1:1:3) | PTFE | 11 | 82.5 |
| Battery 9 | 9 | EC:FEC:EMC(1:1:3) | PTFE | 8.8 | 84.1 |
| Battery 10 | 10 | EC:DFEC:EMC(1:1:3) | PTFE | 10 | 82.8 |
| Battery 11 | 11 | EC:TriFEC:EMC(1:1:3) | PTFE | 10 | 82.7 |
| Battery 12 | 12 | EC:TeFEC:EMC(1:1:3) | PTFE | 10 | 82.6 |
| Battery 13 | 13 | EC:TFPC:EMC(1:1:3) | PTFE | 9.1 | 83.4 |
| Battery 14 | 14 | EC:FGBL:EMC(1:1:3) | PTFE | 15 | 80.1 |
| Battery 15 | 15 | EC:DFGBL:EMC(1:1:3) | PTFE | 14 | 80.9 |
| Battery 16 | 16 | EC:FGVL:EMC(1:1:3) | PTFE | 15 | 80.3 |
| Battery 17 | 17 | EC:DFGVL:EMC(1:1:3) | PTFE | 14 | 80.6 |
| Battery 18 | 18 | EC:FB:DMC(1:1:3) | PTFE | 9.4 | 83.0 |
| Battery 19 | 19 | EC:FB:DEC(1:1:3) | PTFE | 9.0 | 83.6 |
| Battery 20 | 20 | EC:FEC:DMC(1:1:3) | PTFE | 9.3 | 82.9 |
| Battery 21 | 21 | EC:FEC:DEC(1:1:3) | PTFE | 9.0 | 83.5 |
| Battery 22 | 22 | EC:FEC:FB:EMC(1:1:1:2) | PTFE | 8.8 | 84.0 |
| Comparative Battery 1 | A | EC:EMC(1:4) | PE | 75 | 38.1 |
| Comparative Battery 2 | 1 | EC:FB:EMC(1:1:3) | PE | 68 | 42.4 |
| Comparative Battery 3 | 9 | EC:FEC:EMC(1:1:3) | PE | 72 | 39.5 |
| Comparative Battery 4 | A | EC:EMC(1:4) | PTFE | 70 | 40.6 |

The results of Batteries 1 to 22 reveal that when the non-aqueous solvent includes the first solvent and the separator includes polytetrafluoroethylene containing a substituent group with electron-withdrawing property, the amount of metal deposited on the negative electrode after storage is decreased and the capacity recovery rate is favorably improved. Since the PTFE separator containing a substituent group with electron-withdrawing property in its molecules is used, the oxidation decomposition of the separator itself is inhibited. Moreover, since the non-aqueous solvent includes a fluorine-containing cyclic compound, the wettability of the separator with the electrolyte is improved and the oxidation decomposition of the non-aqueous electrolyte is also inhibited. Presumably, by virtue of both of these effects, the leaching of metal cations from the positive electrode was prevented and the foregoing results were achieved.

In the case where the non-aqueous solvent included at least one selected from the group consisting of a fluorine-containing aromatic solvent and a fluorine-containing cyclic carbonic acid ester, the storage characteristics (capacity recovery rate) were excellent. The fluorine-containing aromatic solvent and the fluorine-containing cyclic carbonic acid ester can significantly lower the surface tension of the non-aqueous electrolyte. This improves the wettability of the separator with the non-aqueous electrolyte and suppresses the local increase in voltage, to smooth the voltage in the electrode plate assembly. Presumably, for this reason, the oxidation decomposition of the non-aqueous solvent was remarkably inhibited even when the battery was stored under high voltage and high temperature.

Example 2

Batteries 23 to 39

Batteries 23 to 39 were fabricated in the same manner as Battery 9 except that separators made of the materials as shown in Table 2 were used.

These batteries were used to measure the amount of metal deposited on the negative electrode after storage and the capacity recovery rate after storage were measured in the same manner as described above. It should be noted that the results of Battery 9 are also shown in Table 2.

Acronyms of the materials of the separator shown in Table 2 are as follows.

PCTFE: Polychlorotrifluoroethylene
PFA: Tetrafluoroethylene-perfluoroalkyl vinylether copolymer
FEP: Tetrafluoroethylene-hexafluoropropylene copolymer
PA: Polyamide
PI: Polyimide
PAI: Polyamide-imide
PEI: Polyetherimide
PAR: Polyarylate
PSF: Polysulfone
PES: Polyethersulfone
PEEK: Polyetheretherketone
PET: Polyethylene terephthalate
PBT: Polybutylene terephthalate
ASA: Acrylonitrile-styrene-acrylate copolymer
PAN-containing insulating layer: Insulating layer including a polymer containing acrylonitrile units (PAN) and including alumina PVDF-containing insulating layer: Insulating layer including polyvinylidene fluoride (PVDF) and alumina PES-containing insulating layer: Insulating layer including polyethersulfone (PES) and alumina These separators were fabricated in the manner as described above.

Each polymer was dissolved in a predetermined organic solvent to prepare a polymer solution. This solution was extruded into a sheet through the dies on an extruder. Subsequently, the extruded sheet was cooled down to 90° C. or less at a rate of 50° C./min, to give a gel-like composite.

Thereafter, this gel-like molded material was subjected to biaxial drawing at a predetermined magnification to give a molded material. Subsequently, the molded material thus obtained was washed with a washing agent until the content of residual solvent became less than 1 wt % of the molded material. The washing agent was varied as needed depending on the type of solvent used. Thereafter, the molded material was dried to remove the washing agent.

Lastly, the molded material after drying was subjected to thermosetting at a temperature of 100° C. or more to give a separator.

The thickness of the separators thus obtained was 54 μm and the porosity was 61%.

The PAN-containing insulating layer, the PVDF-containing insulating layer, and the PES-containing insulating layer were fabricated in the following procedures.

970 g of alumina having a median diameter of 0.3 μm, 375 g of modified polyacrylonitrile rubber binder (BM-720H (solid content concentration: 8 wt %) available from Zeon Corporation, Japan), and an appropriate amount of N-methyl-2-pyrrolidone were stirred with a double-arm kneader, whereby a paste was prepared. This paste was applied onto both of the negative electrode active material layers in a thickness of 20 μm, dried, and then further dried at 120° C. for 10 hours under vacuum reduced pressure to form the PAN-containing insulating layer.

The PVDF-containing insulating layer and the PES-containing insulating layer were formed in the same manner as describe above except that polyvinylidene fluoride (solid content concentration: 8 wt %) and polyethersulfone (solid content concentration: 8 wt %) were used in place of the modified polyacrylonitrile rubber binder, respectively.

From Table 2, it is found that even when the type of constituent material of the separator is varied, as long as the material contains a substituent group with electron-withdrawing property, the amount of metal deposited on the negative electrode after storage is decreased and the capacity recovery rate is favorably improved. This is presumably because, as in the case as described above, both the oxidation decomposition of the separator and that of the non-aqueous solvent were inhibited, and thus the leaching of metal cations from the positive electrode was prevented.

Among these, in Batteries 9 and 24 to 25 including a separator made of a material containing fluorine atoms in its composition, the metal deposition was small and the capacity recovery rate was improved. This was presumably because the oxidation resistance of the separator was further enhanced by virtue of the strong electron-withdrawing property of fluorine atoms, and the oxidation decomposition was more effectively inhibited.

Moreover, from Table 2, in Battery 9 in which the constituent material of the separator was PTFE, the storage characteristics were particularly excellent. Since PTFE contains four fluorine atoms in its repeating unit, by virtue of the strong electron-withdrawing property of fluorine atoms, electrons are not localized in the polymer constituting the separator. Presumably, for this reason, electrons were not easily withdrawn, and the oxidation resistance of the separator was particularly improved.

Batteries 37 to 39 comprising an insulating layer including a polymer containing a substituent group with electron-withdrawing property and including an inorganic filler also exhibited a small metal deposition amount and a high capacity recovery rate as compared with other batteries. The oxidation resistance of this insulating layer is high because it contains a large amount of inorganic filler. Presumably, for this reason, the oxidation decomposition of the separator was inhibited.

Among these, the storage characteristics of Battery 37 comprising an insulating layer including a polymer containing acrylonitrile units and including an inorganic filler were particularly excellent. When a polymer containing acrylonitrile units is included in the insulating layer, the dispersibility of the polymer and the inorganic oxide in the insulating layer

TABLE 2

|  | Composition of non-aqueous solvent (volume ratio) | Constituent material of separator | Metal deposition amount after storage (μg/g) | Capacity recovery rate (%) |
|---|---|---|---|---|
| Battery 9 | EC:FEC:EMC(1:1:3) | PTFE | 8.8 | 84.1 |
| Battery 23 |  | PCTFE | 11 | 82.3 |
| Battery 24 |  | PFA | 9.8 | 83.2 |
| Battery 25 |  | FEP | 9.0 | 83.8 |
| Battery 26 |  | PA | 11 | 82.1 |
| Battery 27 |  | PI | 12 | 83.2 |
| Battery 28 |  | PAI | 11 | 82.0 |
| Battery 29 |  | PEI | 13 | 81.5 |
| Battery 30 |  | PAR | 15 | 80.6 |
| Battery 31 |  | PSF | 14 | 80.9 |
| Battery 32 |  | PES | 13 | 81.4 |
| Battery 33 |  | PEEK | 15 | 80.5 |
| Battery 34 |  | PET | 16 | 80.2 |
| Battery 35 |  | PBT | 15 | 80.4 |
| Battery 36 |  | ASA | 14 | 81.0 |
| Battery 37 |  | PAN-containing insulating layer | 8.9 | 84.0 |
| Battery 38 |  | PVDF-containing insulating layer | 9.1 | 83.6 |
| Battery 39 |  | PES-containing insulating layer | 9.7 | 83.3 | is excellent. Presumably, for this reason, the effect of inhibiting the oxidation decomposition of the separator was improved.

Example 3

Batteries 40 to 43

Batteries 40 and 42 were fabricated in the same manner as Batteries 9 and 37, respectively, except that a reduction resistant film made of polyethylene (PE) (Hipore™ available from Asahi Kasei Corporation, thickness: 20 μm) was disposed between the separator and the negative electrode. Further, Batteries 41 and 43 were fabricated in the same manner as Batteries 9 and 37, respectively, except that a reduction resistant film made of polypropylene (PP) (Celgard2400 available from Celgard K. K., thickness: 25 μm) was disposed between the separator and the negative electrode.

With respect to these batteries, the amount of metal deposited on the negative electrode after storage and the capacity recovery rate after storage were measured in the same manner as described above. The results are shown in Table 3. It should be noted that the results of Batteries 9 and 37 are also shown in Table 3.

TABLE 3

| | Separator | | Metal deposition amount after storage (μg/g) | Capacity recovery rate (%) |
|---|---|---|---|---|
| | Negative electrode side | Positive Electrode side | | |
| Battery 9 | PTFE | PTFE | 8.8 | 84.1 |
| Battery 40 | PE | PTFE | 5.5 | 88.5 |
| Battery 41 | PP | PTFE | 6.3 | 87.9 |
| Battery 37 | PAN-containing insulating layer | PAN-containing insulating layer | 8.9 | 84.0 |
| Battery 42 | PE | PAN-containing insulating layer | 5.8 | 88.1 |
| Battery 43 | PP | PAN-containing insulating layer | 6.6 | 87.3 |

From Table 3, in Batteries 40 and 42 in which a reduction resistant film made of PE was additionally disposed between the separator and the negative electrode, and Batteries 41 and 43 in which a reduction resistant film made of PP was additionally disposed between the separator and the negative electrode, the amounts of metal deposited on the negative electrode after storage were small as compared with those in Batteries 9 and 37. Moreover, the capacity recovery rates in Batteries 40 to 43 were favorable than those in Batteries 9 and 37. This was presumably because the film made of PE or PP having a high reduction resistance disposed in the negative electrode side prevented the separator made of PTFE or the separator made of an PAN-containing insulating layer disposed in the positive electrode side from being reduced.

Example 4

Battery 44

Battery 44 was fabricated in the same manner as Battery 9 except that a reduction resistant layer was provided on the negative electrode.

With respect to Battery 44, the amount of metal deposited on the negative electrode after storage and the capacity recovery rate after storage were measured in the same manner as described above. The results are shown in Table 4. It should be noted that the results of Battery 9 are also shown in Table 4.

[Fabrication of Reduction Resistant Layer on Negative Electrode]

970 g of alumina having a median diameter of 0.3 μm, 375 g of N-methyl-2-pyrrolidone (NMP) solution including a modified polyacrylonitrile rubber binder (BM-720H available from Zeon Corporation, Japan) (solid content: 8 wt %), and an appropriate amount of NMP were stirred with a double-arm kneader, whereby a paste was prepared. This paste was applied onto both of the negative electrode active material layers on the negative electrode, dried, and then further dried at 120° C. for 10 hours under vacuum reduced pressure to form a reduction resistant layer. In each negative electrode active material layer, the thickness of the paste applied was 5 μm.

TABLE 4

| | Oxidation resistant layer | Metal deposition amount after storage (μg/g) | Capacity recovery rate after storage (%) |
|---|---|---|---|
| Battery 9 | Without | 8.8 | 84.1 |
| Battery 44 | With | 6.7 | 86.0 |

From Table 4, in Battery 44 in which a reduction resistant layer was additionally provided on the negative electrode, the amount of metal deposited on the negative electrode after storage was small as compared with that in Battery 9. Moreover, the capacity recovery rate in Battery 44 was more favorable than that in Battery 9. This was presumably because the reduction resistance layer provided on the negative electrode prevented the separator made of PTFE from being reduced.

Example 5

In this Example, Battery 9 was used to measure the amount of metal deposited on the negative electrode after storage and the capacity recovery rate in the same manner as described above. In the measurement of these, the charge-end-voltage was set at 4.2V, 4.3V, 4.4V, 4.5V, 4.6V or 4.7V. The results are shown in Table 5.

TABLE 5

| End-of-charge voltage (V) | Metal deposition amount after storage (μg/g) | Capacity recovery rate after storage (%) |
|---|---|---|
| 4.2 | 20 | 71.7 |
| 4.3 | 8.8 | 84.1 |
| 4.4 | 9.4 | 83.0 |

TABLE 5-continued

| End-of-charge voltage (V) | Metal deposition amount after storage (μg/g) | Capacity recovery rate after storage (%) |
|---|---|---|
| 4.5 | 11 | 82.3 |
| 4.6 | 15 | 80.2 |
| 4.7 | 25 | 68.8 |

From Table 5, it is found that in the case where the non-aqueous solvent includes a fluorine-containing cyclic carbonic acid ester, and a separator made of PTFE is used, by setting the voltage during charge (i.e., end-of-charge voltage) at 4.3 to 4.6 V, the amount of metal deposited on the negative electrode after storage is remarkably decreased and the capacity recovery rate is favorably improved. It should be noted that, also in the case where the non-aqueous solvent included a fluorine-containing aromatic solvent and/or a fluorine-containing cyclic carboxylic acid ester in place of the fluorine-containing cyclic carbonic acid ester or in addition to the fluorine-containing cyclic carbonic acid ester, and a separator made of a material containing a substituent group with electron-withdrawing property other than PTFE was used, the same tendency as described above was observed.

Example 6

Battery 45

Battery 45 was fabricated in the same manner as Battery 9 except that $Li[Ni_{1/2}Mn_{3/2}]O_4$ was used as the positive electrode active material.

Comparative Example 5

Comparative Battery 5 was fabricated in the same manner as Comparative Battery 1 except that $Li[Ni_{1/2}Mn_{3/2}]O_4$ was used as the positive electrode active material.

Comparative Example 6

Comparative Battery 6 was fabricated in the same manner as Comparative Battery 3 except that $Li[Ni_{1/2}Mn_{3/2}]O_4$ was used as the positive electrode active material.

Comparative Example 7

Comparative Battery 7 was fabricated in the same manner as Comparative Battery 4 except that $Li[Ni_{1/2}Mn_{3/2}]O_4$ was used as the positive electrode active material.

With respect to Battery 45 and Comparative Batteries 5 to 7, the amount of metal deposited on the negative electrode after storage and the capacity recovery rate after storage were measured in the same manner as described above. It should be noted that in $Li[Ni_{1/2}Mn_{3/2}]O_4$ serving as the positive electrode active material, the discharge voltage is as high as 4.6 V to 4.8 V with respect to the lithium metal. For this reason, the end-of-charge voltage in the foregoing measurement was set at 4.9 V. In the measurement of the amount of metal deposited on the negative electrode, the amount of Ni and the amount of Mn were quantitated by ICP emission spectrophotometry, and the total amount of these was referred to as the amount of metal deposited on the negative electrode.

The results are shown in Table 6.

TABLE 6

| | Composition of non-aqueous solvent (volume ratio) | Constituent material of separator | Positive electrode active material | Metal deposition amount after storage (μg/g) | Capacity recovery rate (%) |
|---|---|---|---|---|---|
| Battery 45 | EC:FEC:EMC (1:1:3) | PTFE | $Li[Ni_{1/2}Mn_{3/2}]O_4$ | 14 | 80.4 |
| Comparative Battery 5 | EC:EMC (1:4) | PE | $Li[Ni_{1/2}Mn_{3/2}]O_4$ | 116 | 20.5 |
| Comparative Battery 6 | EC:FEC:EMC (1:1:3) | PE | $Li[Ni_{1/2}Mn_{3/2}]O_4$ | 113 | 22.0 |
| Comparative Battery 7 | EC:EMC (1:4) | PTFE | $Li[Ni_{1/2}Mn_{3/2}]O_4$ | 102 | 23.6 |

From Table 6, it is found that even in the case of using $Li[Ni_{1/2}Mn_{3/2}]O_4$ as the positive electrode active material, when the non-aqueous solvent includes a first solvent and the separator includes a material containing a substituent group with electron-withdrawing property, the amount of metal deposited on the negative electrode after storage is decreased and the capacity recovery rate after storage is favorably improved.

INDUSTRIAL APPLICABILITY

In the non-aqueous electrolyte secondary battery of the present invention, even after stored under high voltage and high temperature, it is possible to suppress the deterioration in the rate performance. As such, the non-aqueous electrolyte secondary battery of the present invention can be used, for example, as a power source of equipment which may be stored at high temperature.

The invention claimed is:

1. A non-aqueous electrolyte secondary battery comprising a positive electrode including an active material absorbing and desorbing lithium ions, a negative electrode including an active material absorbing and desorbing lithium ions, a separator interposed between said positive electrode and said negative electrode, and a non-aqueous electrolyte, wherein
said separator includes a material containing a substituent group with electron-withdrawing property;
said non-aqueous electrolyte includes a non-aqueous solvent and a solute dissolved therein, and said non-aqueous solvent includes:
a first solvent of at least one selected from the group consisting of a fluorine-containing cyclic carbonic acid ester, and a fluorine-containing cyclic carboxylic acid ester;
a second solvent of ethylene carbonate; and a third solvent of at least one selected from the group consisting of diethyl carbonate (DEC), ethyl methyl carbonate (EMC), and dimethyl carbonate (DMC), wherein the separator includes polytetrafluoroethylene (PTFE), and a content of said first solvent is 10 to 50 vol % of said non-aqueous solvent.

2. The non-aqueous electrolyte secondary battery in accordance with claim 1, wherein said non-aqueous solvent includes a fluorine-containing cyclic carboxylic acid ester.

3. The non-aqueous electrolyte secondary battery in accordance with claim 1, wherein said separator further includes an inorganic filler.

4. The non-aqueous electrolyte secondary battery in accordance with claim 1, wherein a reduction resistant film or a reduction resistant layer including an inorganic filler is provided between said separator and said negative electrode.

5. The non-aqueous electrolyte secondary battery in accordance with claim 1, wherein the active material included in said positive electrode contains $Li[Ni_{1/2}Mn_{3/2}]O_4$.

6. A system comprising the non-aqueous electrolyte secondary battery in accordance with claim 1, and a charger for charging said non-aqueous electrolyte secondary battery, wherein an end-of-charge voltage in said charger is set at 4.3 to 4.6 V.

* * * * *